United States Patent
Sapuppo et al.

[19]

[11] Patent Number: 5,881,598
[45] Date of Patent: Mar. 16, 1999

[54] FLAT-PACK GYROSCOPE

[75] Inventors: Michele Sapuppo, Andover; Donato Cardarelli, Medfield; Charles R. Dauwalter, Newton Highlands, all of Mass.

[73] Assignee: Milli Sensor Systems and Actuators, Inc., West Newton, Mass.

[21] Appl. No.: 884,291

[22] Filed: Jun. 27, 1997

Related U.S. Application Data

[60] Provisional application No. 60/020,911, Jun. 27, 1996.

[51] Int. Cl.$^6$ .......................... G01C 19/28; G01C 19/06
[52] U.S. Cl. ..................... 74/5.6 E; 74/5.7; 74/5 F

[56] References Cited

U.S. PATENT DOCUMENTS

| 4,592,242 | 6/1986 | Kempas | 74/5 F |
| 4,655,096 | 4/1987 | Westhaver et al. | 74/5 F |
| 5,353,656 | 10/1994 | Hawkey et al. | 74/5.7 X |

*Primary Examiner*—Rodney H. Bonck
*Attorney, Agent, or Firm*—Brian M. Dingman

[57] ABSTRACT

A flat pack gyroscope fabricated of a number of discrete flat layers, which, when assembled together, accomplish a version of a single degree of freedom, spinning wheel gyroscope.

18 Claims, 12 Drawing Sheets

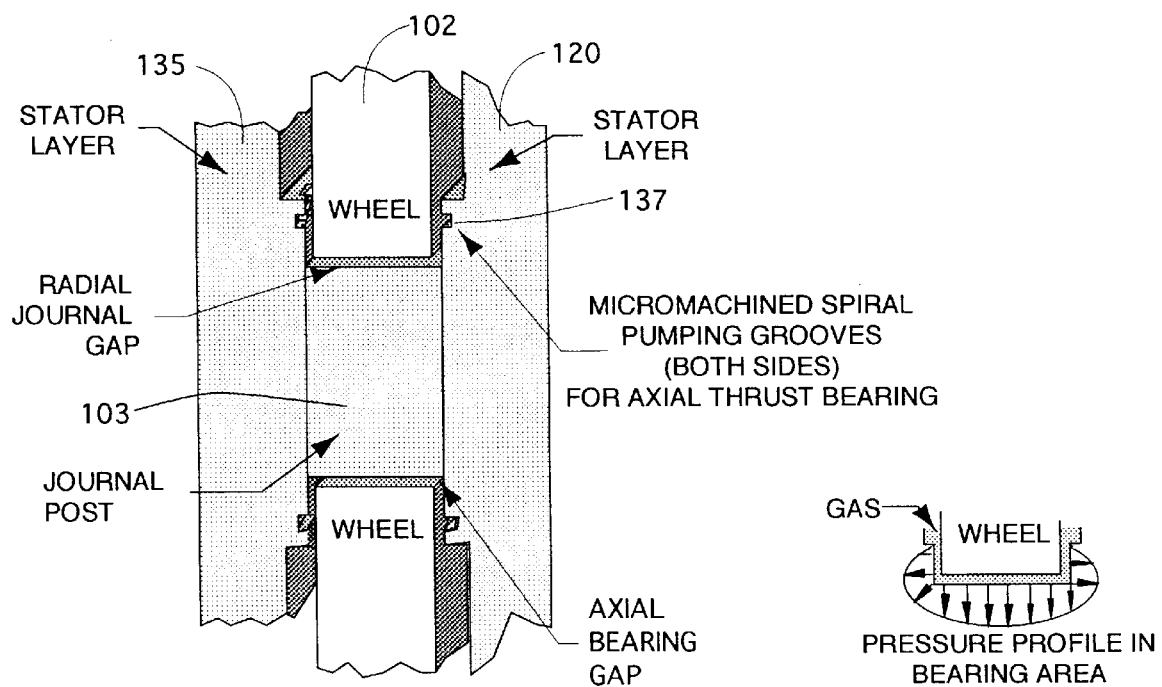
FIGURE 12A
FIGURE 12B
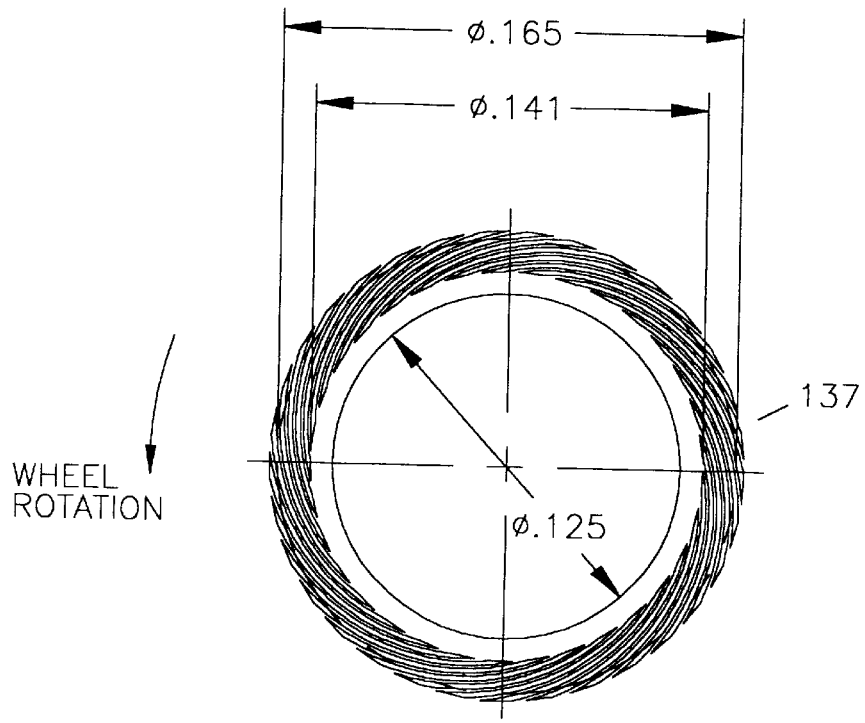
FIGURE 13

FLAT-PACK GYROSCOPE

CROSS-REFERENCE TO RELATED APPLICATION

This application is a continuation in part of provisional application Ser. No. 60/020,911, filed on Jun. 27, 1996.

FIELD OF INVENTION

This invention relates to a single-degree-of-freedom, spinning wheel gyroscope that is designed and fabricated in planar, multilayer (Flat-pack) configuration based on Millimachining principles and methodology. Planar components and subcomponents are included.

BACKGROUND OF INVENTION

Inertial guidance requires gyroscopes and accelerometers to measure the heading and linear motion of a vehicle. Spinning wheel gyroscopes have fallen out of favor in the last two decades relative to novel non-moving parts approaches represented by optical gyroscopes. With the recent development of MEMS (MicroElectroMechanical Systems) technologies, mechanical gyroscopes are again under consideration. The primary driver is that optical devices (Ring Laser Gyroscopes and Fiber-Optic Gyros) are large and do not lend themselves to automated fabrication. The result is that the manufacture of optical gyroscopes requires a large infrastructure and costs are high. The attraction of the MEMS-based microgyros is that they are small, can be integrated with the supporting electronics and can be batch-fabricated for low cost. The result is a great reduction in size, cost and power consumption. However, MEMS gyroscopes are microscopic in size which limits their performance. In addition, they are based primarily on oscillatory motions (Coriolis Effect) for generating angular momentum and for detecting rotational motion.

The Millimachined Flat-Pack Gyroscopes described here combine traditional spinning wheel concepts, that are well-understood, with MEMS technologies extended to larger dimensions to obtain higher performance capability yet retain the cost advantages of batch-processability. The approach is to reduce the conventional three dimensional single-degree-of-freedom design to a planar configuration which can be reduced to a multiple layer set. Each layer is batch-fabricated and the complete gyro is formed by stacking the layers. The electronics can be integrated into each layer as required or can be part of separate layers.

Millimachining is the design and fabrication of instruments and devices based on multi-layers. The functionality of the device is reduced to components which are made up of subcomponents. The subcomponents are located within a layer and the assembly of the layers forms the components and therefore the device. Millimachined devices are assembled by the pure stacking of the layers. The gyro has been converted from a three dimensional entity to a planar configuration which could be reduced to a set of layers. The layers are then fabricatable by modern planar technologies which are batch processable much like the Integrated Circuits.

SUMMARY OF INVENTION

It is an object of this invention to reduce three dimensional, single degree of freedom spinning wheel gyro to a multi-layer design in order to allow the fabrication using MEMS technologies extended to the larger size.

It is an object of this invention to apply planar technologies such as used for MEMS for the fabrication of each layer.

It is an object of this invention to batch fabricate each layer in order to reduce the price of gyro fabrication.

It is an object of this invention to devise planar components and subcomponents which perform the functions of the gyro.

It is an object of this invention to devise the Millimachining, multi-layer approach for the design and fabrication of gyros and other instruments.

This invention features a single degree of freedom, spinning wheel gyroscope for determining rotation about a gyroscope input axis, comprising: a fixed case; a torque summing member mounted within the case by a pair of coaxial flexures, for pivoting on the flexures about an output axis which is transverse to the gyroscope input axis; a disk encircled by the torque summing member and adapted to rotate about a spin axis which is transverse to both the output axis and the gyroscope input axis; means for rotating the disk about the spin axis; means for determining the pivotal position of the torque summing member about the output axis; and means, responsive to the means for determining the pivotal position of the torque summing member, for determining rotation of the case about the gyroscope input axis.

The gyroscope may be constructed of a plurality of discrete layers, and in which the disk is within a discrete layer of the gyroscope. The means for rotating the disk about the spin axis may include disk driving means located in two discrete stator layers each directly adjacent to the discrete layer in which the disk is located. The disk driving means may include motor stators in each of the two discrete stator layers. The motor stators may each include means for creating a rotating magnetomotive force on the disk. The means for creating a rotating magnetomotive force may include a multi-phase, multi-pole stator, and means for energizing the stator poles in quadrature to create a rotating electromagnetic field acting upon the disk. The disk may be made of magnetic material with relatively high magnetic hysteresis.

The means for determining the pivotal position of the torque summing member may be partially carried by the two discrete stator layers. The gyroscope may further include two discrete cover layers directly adjacent to the stator layers. The means for determining the pivotal position of the torque summing member may be also partially carried by the two discrete cover layers. The stator layers may carry capacitive pick-off members, and the cover layers may carry capacitive pick-off members directly adjacent to but spaced from the pick-off members on the stator layers, to accomplish capacitive sensing of the distance between adjacent but spaced pick-off members.

The gyroscope may further include gas bearing means for supporting the disk as it rotates about the spin axis. The gas bearing means may include grooves in each of the two discrete stator layers, the grooves proximate the disk. The disk may be annular, and the gas bearing means may further include a cylindrical journal post within the disk annulus central opening, the journal post very close to but not touching the annulus.

The flexures may have a relatively large spring constant, and a relatively small damping, to accomplish a rate gyroscope in which the angular pivotal deflection of the torque summing member is related to the time rate of change of gyroscope rotation about the input axis. The flexures may have a relatively large damping and relatively small spring constant, to accomplish a rate integrating gyroscope in which the angular pivotal deflection of the torque summing member is proportional to the angle of rotation of the gyroscope about the input axis.

Also featured is a single degree of freedom, multiple-layer spinning wheel gyroscope for determining rotation about a gyroscope input axis, comprising: a central discrete layer comprising a frame carrying an internal mechanical housing member mounted by a pair of coaxial flexures within the frame to rotate about an output axis transverse to the gyroscope input axis, and a central annular disk within the mechanical housing member, made of a magnetic material, and adapted to rotate about a spin axis which is transverse to both the output axis and the gyroscope input axis; means for rotating the disk about the spin axis, including motor stators located in each of two discrete stator layers each directly adjacent to one side of the central discrete layer in which the disk is located, in which the motor stators each include a multi-phase, multi-pole stator, and means for energizing the stator poles in quadrature to create a rotating electromagnetic field acting upon the disk. The motor stators are each carried by a stator support member, and the stator support members are fixed to the internal mechanical member to create a torque summing member; two discrete cover layers directly adjacent to the stator layers; means, carried by the stator support members and the cover layers, for determining the pivotal position of the torque summing member about the output axis; and means, responsive to the means for determining the pivotal position of the torque summing member, for determining rotation of the case about the gyroscope input axis.

Also featured is a single degree of freedom, flat-pack, multiple-layer spinning wheel gyroscope for determining rotation about a gyroscope input axis, comprising: a central discrete layer comprising a flat frame carrying an internal mechanical housing member mounted by a pair of coaxial flexures within the frame to rotate about an output axis transverse to the gyroscope input axis, and a central annular disk within the mechanical housing member, made of a magnetic material, and adapted to rotate about a spin axis which is transverse to both the output axis and the gyroscope input axis; means for rotating the disk about the spin axis, including motor stators located in each of two discrete stator layers each directly adjacent to one side of the central discrete layer in which the disk is located, in which the motor stators each include a multi-phase, multi-pole stator, and means for energizing the stator poles in quadrature to create a rotating electromagnetic field acting upon the disk; wherein the motor stators are each carried by a stator support member, and the stator support members are fixed to the internal mechanical member to create a torque summing member; flat stator layer external frames surrounding each the stator support member; mechanical tangs between each stator layer external frame and the stator support member surrounded by the frame, to maintain the stator support members fixed during gyroscope assembly; two discrete flat cover layers directly adjacent to the stator layers; wherein the stator layer external frames are each fixed to a cover layer and to the frame of the central layer, to create a fixed gyroscope case; capacitive pick-off means carried by the stator support members and the cover layers, for determining the pivotal position of the torque summing member about the output axis; and means, responsive to the capacitive pick-off means for determining the pivotal position of the torque summing member, for determining rotation of the case about the gyroscope input axis.

BRIEF DESCRIPTION OF THE DRAWINGS

Other objects, features and advantages will occur to those skilled in the art from the following description of the preferred embodiments, and the accompanying drawings, in which:

FIG. 12A is a greatly enlarged, partial, cross sectional view of a preferred gas bearing for supporting the wheel of the gyroscope of this invention;

FIG. 12B is a schematic view of the pressure profile in the gas bearing of FIG. 12A;

FIG. 13 is a top view of the grooves which form a part of the gas bearing of FIG. 12A;

DESCRIPTION OF THE PREFERRED EMBODIMENTS

Flat-Pack Gyroscope

Flat-pack gyroscope technology is a design philosophy which combines three enabling considerations:

1. Apply the well established principles of design and operation of the mechanical gyros and accelerometers which have demonstrated the highest performance in inertial navigation and guidance systems;

2. Implement modern fabrication technologies, that do not rely on operator-sensitive procedures, for producing low-cost, reliable high-performance inertial instruments; and 3. Develop novel inertial instrument configurations to fill the performance and size gap between high performance traditional instruments and low performance microinstruments.

The design philosophy is to convert traditional instrument design concepts into pseudo-two dimensional configurations so that MEMS technologies, which are essentially planar in nature, can be successfully applied for fabrication. With these configurations, complex structures may be realized by vertically integrating through planar assemblies. Fabrication and assembly processes will be amenable to automated assembly as they have the advantages of modularity and result in a complete packaged device.

Figure 1:
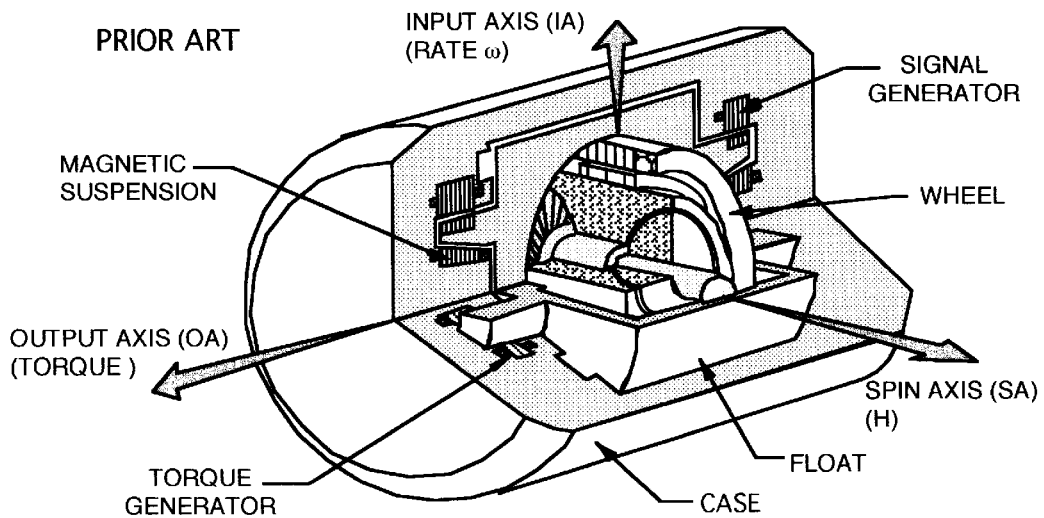
FIG. 1 is a cut-away, schematic view of a prior art single degree of freedom gyroscope.

The Flat-Pack Gyro (FPG) of this invention is based on the classic, Single-Degree-of-Freedom (SDF) gyroscope as defined by Ausman[i]. The conventional SDF gyro consists of a spinning cylindrical wheel supported within a float that is contained within the case, as shown in FIG. 1. While the member containing the wheel actually does float in the floated SDF gyro, this arrangement is not true for all SDF gyros, and the term "torque summing member" or "TSM" is more descriptive. The wheel and TSM are constrained to rotate about orthogonal axes, the spin axis and the output axis, respectively. When the case, which is mounted to the vehicle in strapdown systems or to the stable platform in gimbaled systems, is rotated about a mutual third axis (the input axis), the float rotates about the output axis in response to the resulting gyroscopic torque. The gyroscopic torque, neglecting non-linear terms, is given by $$L_{float} = H_{wheel} \dot{\phi}_{input}$$

where $H_{wheel}$ is the angular momentum of the wheel, $\dot{\phi}_{input}$ is the angular velocity about the input axis, and $L_{float}$ is the resulting torque on the TSM. In a practical implementation, the TSM is also acted on by torques due to its inertia ($I_0$), damping (D), and restraining spring (K). In this case, the equation of motion of the TSM is $$I_0 \ddot{v} + D\dot{v} + Kv = H_{wheel} \dot{\phi}_{input}$$

where v is the TSM rotation angle. From this equation, gyro designers have evolved three classes of gyros, according to the specific function required.

For large K, the steady-state output angle is $$v(t) = \frac{H_{wheel}}{K} \dot{\phi}_{input}(t)$$

and the output angle is related to the time rate of change of the input angle. This implementation is referred to as a Rate Gyro. Its scale factor ($S_R$) is given by $$S_R = \frac{H_{wheel}}{K}$$

Thus, the smaller the K, the greater the float deflection, hence the greater the sensitivity. In practice, the selection of K is constrained by two conflicting considerations. First, the minimum resolvable input is limited by the output axis angle sensor resolution. Second, the maximum output axis rotation must be constrained to limit response to inputs about the input axis. A rate gyro is usually operated open loop.

[i] Inertial Guidance, G. R. Pitman, Jr., Editor, University of California Engineering and Physical Sciences Extension Series, J. Wiley and Sons, Inc. NY. 1962; Chapter 3, J. S. Ausman.

For implementations with large D, and negligible K, the steady-state output angle solution is $$v(t) = \frac{H_{wheel}}{D} \dot{\phi}_{input}(t)$$

and the output angle is proportional to the input angle, which is the time integral of the input angular rate. Accordingly, this implementation is referred to as a Rate Integrating Gyro (RIG). To design a very accurate rate integrating gyro, K must be reduced as much as possible, otherwise the gyro output also contains a term proportional to input angular rate. For high performance RIGs, the required low value of K is attained by making the TSM neutrally buoyant (or floated) in the liquid that provides the damping and providing small pivots (for negligible K) instead of flexures to locate the TSM relative to the case. In the highest performing RIGs, magnetic bearings are used instead of pivots to locate the TSM. These bearings must be sufficiently stiff to prevent float rotation about the orthogonal axes in response to case motions. Electrical power for the wheel enclosed within the float is brought to the float by 'flex leads' which have very small cross sections for minimum K. The damping/flotation fluid and 'flex leads' are examples of very critical state-of-the art materials and fabrication technologies that have required much effort and expense in certain very high performance conventional systems. The scale factor ($S_{RI}$) for this implementation is $$S_{RI} = \frac{H_{wheel}}{D}$$

and is inversely proportional to D. This class of gyro is usually operated in a closed loop mode, either by using it to control an inertially stabilized platform or by closing the loop through the gyro output axis torquer for operation in a strapdown mode.

The response of the third class of gyro is dominated by the TSM inertia. It is perhaps most commonly used as a non-restrained (or "free") two-degree-of-freedom gyro, and is not considered practical for a flat-pack implementation at this time.

Figure 2:
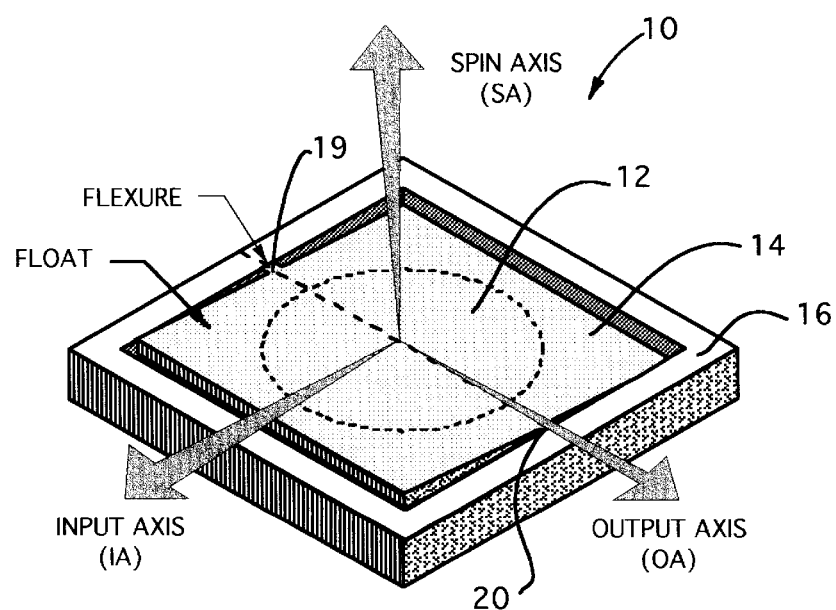
FIG. 2 is a schematic view of a single degree of freedom gyroscope according to this invention.

A cut-away of a conceptual, representative flat-pack SDF gyro 10 configuration of this invention is shown in FIG. 2, which indicates the gyro axes. This configuration concept is achieved by converting the wheel from its usual cylindrical geometry to that of a disk 12. As may be the case with the conventional SDF gyro described above, the wheel is preferably supported on a hydrodynamic gas bearing. In FIG. 2, the TSM 14 is supported by flexures 19, 20 having significant K so the behavior is that of a rate gyro. The flexures couple the TSM to case 16.

Millimachining

Millimachining as applied herein consists of three facets: the design philosophy, the fabrication technology, and computer-aided controls. All three contribute to the goal of producing low-cost, high reliability, high performance instruments in the millimeter to centimeter size range through the adaptation of MEMS technologies to larger sizes.

The design philosophy centrally involves the configuration of an instrument such that planar fabrication approaches may be successfully applied. Simple instrument configurations may be achieved in a single planar layer, whereas complex configurations may be achieved through stacking a set of relatively simple layers. The design philosophy features:

1. Layered construction;
2. Partitioning of instrument functions (components) among layers;
3. Selection of appropriate materials for each layer to optimize functionality while maintaining capability for layer fabrication;
4. Modularity;

5. Fabrication of individual layers through batch-processes at the layer level;
6. Electrical interconnectivity between layers done at the layer edge as an option;
7. Assembly by stacking of layers (unless single layer); and
8. Integral packaging.

Integral packaging refers to the formation of the package as the instrument layers are stacked. Mechanical and electrical interfaces to the outside are built into the individual layers. Partitioning of components among layers is in part done to distribute the instrument complexity equitably in order to reduce criticalities (Achilles heels in the design). Batch processing allows for the selectability within each run so that the best parts can be assembled into the final instrument thereby improving its performance. Modularity allows each layer to be optimized separately. Electrical interconnectivity done at the layer edge has two advantages: the modularity aspect of the layers is improved and the subcomponents of each layer can be accessed separately without dis-assembly of the gyro.

The millimachining fabrication technology is a combination of micromachining, millifabrication and conventional macromachining that is done in a planar form. The common thread is that photolithographic patterning can be applied to define subcomponent features with high precision. Additive as well as subtractive forming processes may be utilized. The materials are selected to satisfy the required functionality and processability requirements. Examples of these approaches include:

1. Macromachining: laser cutting of spring steel to form a layer that requires good flexure properties;
2. Millifabrication: electroplating through molds to form structures; and
3. Micro-devices: deposition of piezoresistive films onto flexures to monitor their stability.

In fact, any layer of the gyro might include all three technologies in a complementary manner.

The practical issues of millifabrication include:
1. The patterning of shapes to high precision (this can be accomplished via photolithographic techniques);
2. Forming of materials to thicknesses up to a millimeter with high aspect ratios; and
3. The ability to form specialized/engineered materials with required properties.

Specialized materials in this sense are materials which provide functionality. A specialized material could be selected for its thermal expansion properties to compensate for thermal expansion between structures to maintain a certain parameter constant. Permalloy is a specialized material because when combined properly with electrical current can generate a magnetic field whose strength can be controlled. Engineered materials might include the integration of the electrical wiring with the Permalloy to affect a monolithic structure (stator) to drive the rotor of a motor. It is considered an engineered material in the context of millimachining because the monolithic structure is to be formed through electroplating or other additive means.

Computer-aided controls provides and implements algorithms for deriving the final product through the analysis and modeling activities, through the design stage and fabrication processes and testing. The intent is to arrive at a product solution iteratively and not through human intervention and "golden hands". Testing at the layer level and during partial assemblies will allow an accurate means for predicting the performance outcome or the means to relate faults to tested pre-conditions.

A note on terminology. In the millimachining approach, each layer may contain subcomponents. When the appropriate layers are stacked, the components are formed. The components such as the motor provide the functions such as spinning the wheel.

Flat-Pack Gyro Designs
Considerations

The design of the FPG of this invention is based on many considerations, including:

1. Each layer should be a planar entity suitable for batch fabrication;
2. The materials and fabrication technology for each layer should be selected to optimize the functional performance of the subcomponents on the layers;
3. Subcomponents/functions should be partitioned among the layers so as to more or less equally share the complexity among them;
4. Fabrication involving critical parameters and geometric tolerances should be achieved through an effective mix of micro, milli and macro technologies, as necessary, to obtain the greatest simplicity and best repeatability with adequate performance;
5. The stress between layers should be considered in the selection of the materials and fabrication processes;
6. The thermal sources should be distributed relative to the thermal paths in such a way as to minimize temperature rise and consequent undesirable effects on the operational parameters such as the gas bearing clearances;
7. The multilayered architecture should be vertically symmetric to minimize the number of layers that need to be designed;
8. The layout within each layer should exploit symmetry;
9. Means should be included for providing electrical connectivity between layers; connectivity through the layer edges is desirable.
10. Each layer should be designed for ease of automated assembly;
11. The assembled set of layers constituting the complete gyro should have provisions for mechanical and electrical interfaces to the system;
12. Cross-coupling between components must be considered in the selection and design of the subcomponents and their location within the instrument;
13. Special materials and fabrication approaches are used;
14. Modularity is to be enabled to allow the upgrade of individual layers;
15. The design should scale dimensionally to allow trade off of performance with size and power;
16. Subcomponents should, insofar as possible, be designed so that they may be used for other planar applications such as flat-pack motors.

Multi-Layer Design

Figure 3:
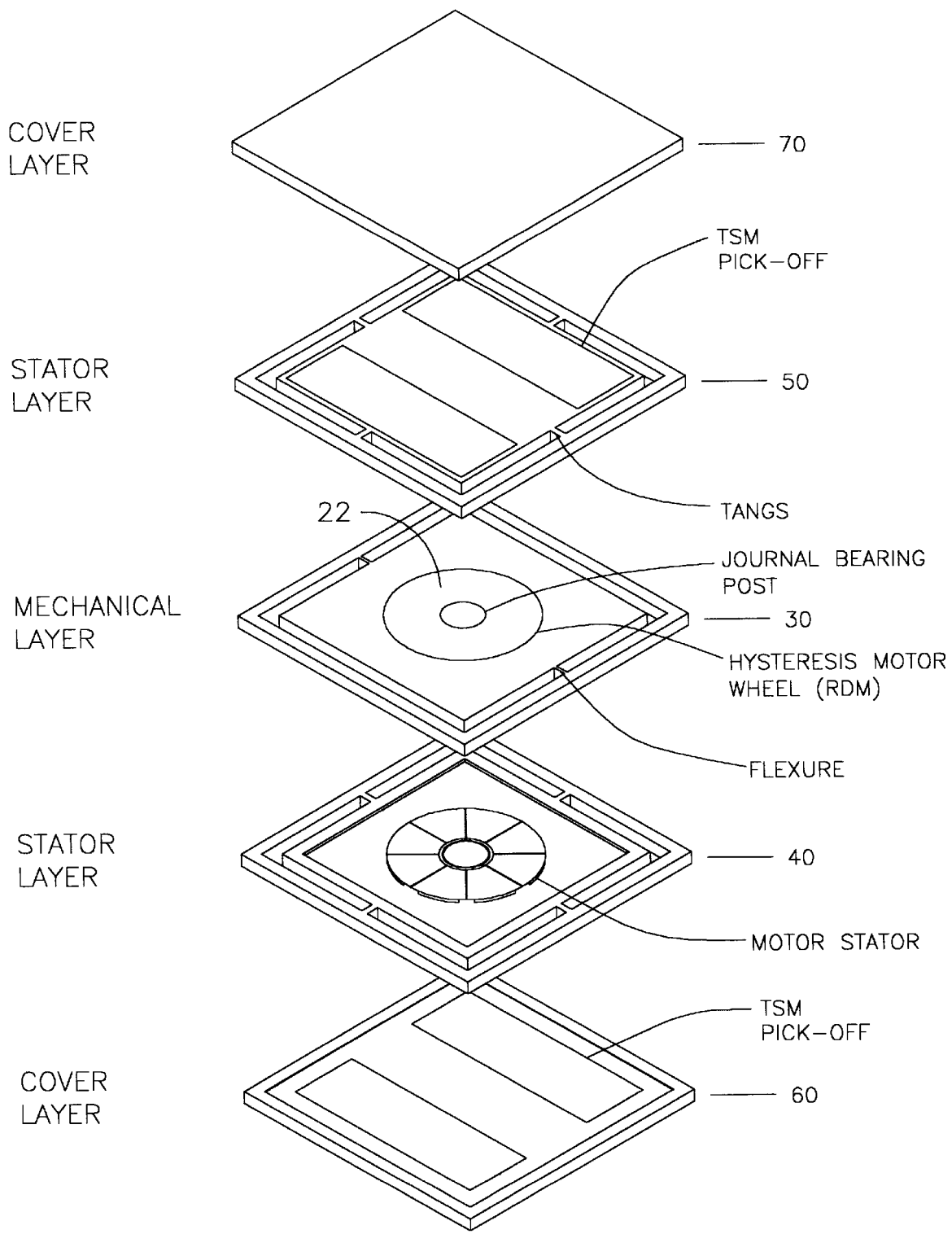
FIG. 3 is an exploded schematic view of an embodiment of the gyroscope of this invention.

The design of the Millimachined Flat-Pack Gyro (FPG) of this invention is partitioned as a five layer architecture as shown in FIG. 3. The spinning wheel is a disk 22 housed in the center layer 30. Two layers 40 and 50 placed on each side of the center layer incorporate the monolithic stators for driving the wheel. The combination of the disk and stators constitutes the spin motor. The hydrodynamic gas bearing (detailed below) incorporates grooves in the stator layer which face the wheel near the inner diameter. The bearing supports and centers the disk within the housing as the disk spins. The three center layers are assembled to make up the gyro TSM. Its rotation is restrained by flexures or damped pivots as desired. The outside layers 60 and 70 encase the TSM and contain the gyro pick-off and actuators for maintaining the float at null; the gyro may be operated in closed-loop mode with the use of the actuators. The assembly of the five layers results in a packaged instrument. The spacing which allows the TSM to rotate is provided by a spacer layer which can be deposited onto the Stator or Cover Layers.

The operation of the FPG design is described in greater detail. A two-phase hysteresis motor is used to drive the disk wheel to develop the required angular momentum. The wheel is hydrodynamically supported as a result of the pressure generated by the gas bearing grooves and journal of the disk by the wheel rotation. The gas bearing is designed for maximum stiffness to withstand the g-environment but with minimum drag to minimize required drive power. The TSM carries the wheel and reacts to gyroscopic torque. As a result of the motion of the vehicle about the "Input Axis", the gyroscopic torque causes the TSM to rotate about the "Output Axis". Because this is the only rotation allowed, the gyro is referred to as a single-degree-of-freedom type. In a closed loop mechanization, the actuators are used in conjunction with a feedback loop to maintain the float at a null (zero rotation) condition.

In the damped pivot implementation, a magnetically-confined ferrofluid (a colloidal suspension of microscopic magnetic particles in a suitable fluid) provides the damping medium and support. The magnetic field is provided by permanent magnets requiring no power.

Damping may also be achievable by other means such as a liquid within the TSM gap.

The most basic parts of the FPG are the subcomponents:
1. Hysteresis motor wheel;
2. Wheel housing;
3. Monolithic motor stator;
4. Thrust and journal bearings;
5. Flexures;
6. TSM pick-off rotor and stator;
7. Actuator rotor and stator; and
8. Case covers.

The components which perform functions are made up of the subcomponents:
1. Hysteresis motor;
2. Gas Bearing;
3. Pick-off;
4. TSM; and
2b. Actuator.

The layers are called:
1. Cover
2. Stator; and
3. Mechanical

Package

The function of the integral gyro package is to provide structural support for the layers, enclosure, electrical and mechanical interfaces to the system and thermal control. The first three have been discussed above. The plan for the thermal environment is discussed further. The thermal environment is primarily based on the heat sources in the gyro. They include the monolithic motor stator, the actuator stators, and the spinning wheel. All are symmetric about the center layer, as well as within the plane of each layer. The power dissipation of the monolithic motor stator is minimized by increasing the efficiency of the motor in the first place. The dissipation of the heat to the outside for the flexurally mounted TSM is primarily through the Stator Layer thickness in which the stator is located and convectively across the TSM pick-off gap to the Cover Layers. The flexure cross-section is too small for sufficient thermal conduction. For the case in which the TSM is supported with a damped pivot, the heat would dissipate across the pivot plus across the TSM gap.

The heat generated by the actuator stator in the Cover Layers is easily removed to the outside by conduction through the layers.

The fact that all sources dissipate energy at a constant rate and are symmetrically located relative to the center of the gyro is in part planned and it is expected that the effects on the operational stability should be minimal.

Preferred Gyro Design; Multi-Layer Configuration

The Mechanical Layer provides a housing for the wheel to spin in. It also provides for the flexure mount and motion of the TSM. The wheel is made of a magnetic material which can be excited by the stators on the Stator Layers to cause the wheel to spin. The assembly of the Stator Layers to the Mechanical Layer sandwiches the Mechanical Layer and provides the alignments of the stators to the wheel and sets the proper motor gap between them. The assembly also provides the wheel support by ball or gas bearings which are located on the Stator Layers and the Mechanical Layers. The Stator and Mechanical Layers are composed of a center part and an outside frame. During the assembly, the outer frames also stack. They form part of the outside package enclosure. The inside part of the Mechanical Layer is flexurally mounted to the outside frame. Tangs, which are bridges between the outer and inner parts, keep the inner part from rotating during assembly. The inside part of the Stator Layer is also tanged to the outer frame. In this case it provides for the alignment of the center parts of the Stator Layers and Mechanical Layer. Once assembly has been made and the motor and wheel perform as required, the center parts are bonded, the flexures mounted and the tangs are removed. This step forms a movable TSM structure with Rotor Capacitive Pick-off plates.

To complete the assembly, the Cover Layers containing the Stator Capacitive Pick-off Plates are added enabling the sensing of the TSM rotation. A spacer layer is added between the Cover and Stator Layers to set the TSM gap that allows rotation.

The Pick-off patterns of the Cover and Stator Layers include circuitry to the edge of the layers where connections to the electronics can be made.

FIGS. 4A–G describe the layer-by-layer lay-out of the preferred embodiment with the included subcomponents.

FIG. 4A is of the Mechanical Layer 100. It contains the disk 102 in the center and a journal post 103 for the radial gas bearing in the center of the disk. Flexures 107, 108 are shown as well as four tangs 112 that join the inner section (termed housing) 109 to the outside frame 111. The outside frame forms the package as the layers are stacked. The full layer is formed by the electroforming of NiFe using the wheel as a mold (described below). This approach develops the required journal bearing clearance. Other electroformable materials may be used. An important consideration is that the material have the same thermal expansion as the wheel since the difference in thickness between the wheel and plated housing sets the gas bearing clearance.

FIGS. 4B and 4C show the surfaces of the identical Stator Layers 120 and 135 which face the Mechanical Layer 100 when assembled. In the figure are shown ferrite core stators with the windings, labelled 122 and 136. The stators have been placed within an annular depression cut into an Alumina plate layer 124 so that the axial distance between the top surface of the stator and the wheel is the motor gap required (on the order of several mils) when assembled. In the region of the Alumina plate within the core inner diameter, the spiral groove pattern 129 is located for the thrust gas bearing. The Stator Layers also utilize tangs 123. After the three center layers are assembled and the flexure installed, the tangs are removed allowing the three inner center sections 109 and 124 to act as the TSM. Alumina is selected since it is non-magnetic, it provides a polished hard surface for the fabrication of gas bearing grooves and it has good thermal conductivity.

FIGS. 4D and 4E show the capacitive pick-off patterns on the sides of the stator layers 120, 135 which face the cover layers 140, 150. Wires 129, 138 are shown bonded to pads 121, 122, and 136, 137, respectively. In order to minimize their impact on the TSM mechanically, the wires pass along the flexure 128 position to the outside frame 129 where they are fixed down.

FIGS. 4F and 4G show the capacitive pick-off patterns 142, 144, and 152, 154, on the cover layers 140, 150, respectively. The circuits go to the edge where the wires are bonded. The material for the cover layers is also Alumina for the reason that the material produces a low capacitance across the material thickness. A metal shield (not shown) is plated on the outside surface of the cover to minimize the capacitive sensitivity to outside voltage sources.

Figure 4:
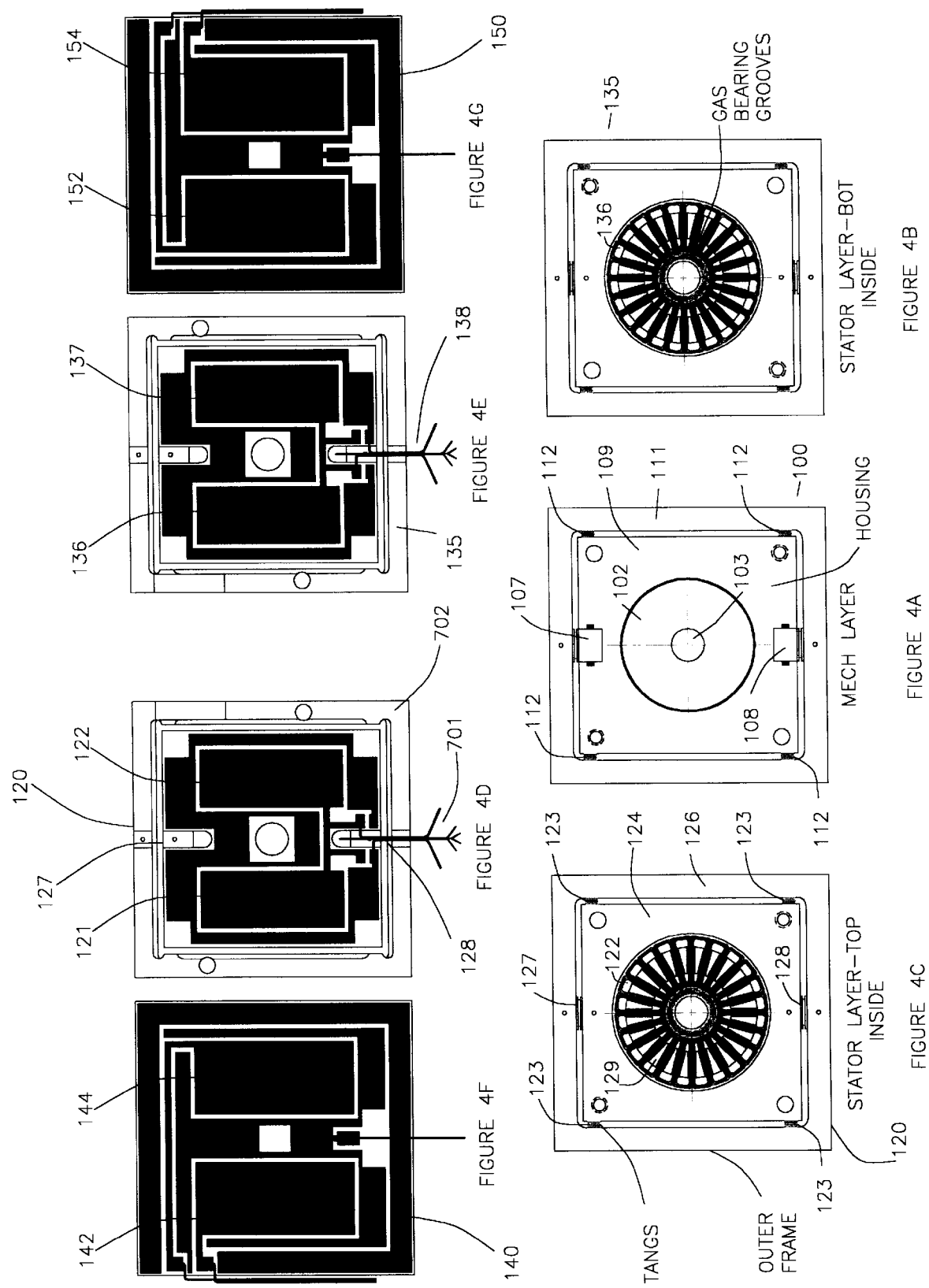
FIGS. 4A–4G are schematic views of the functional portions of an embodiment of the gyroscope of FIG. 3.
Figure 5:
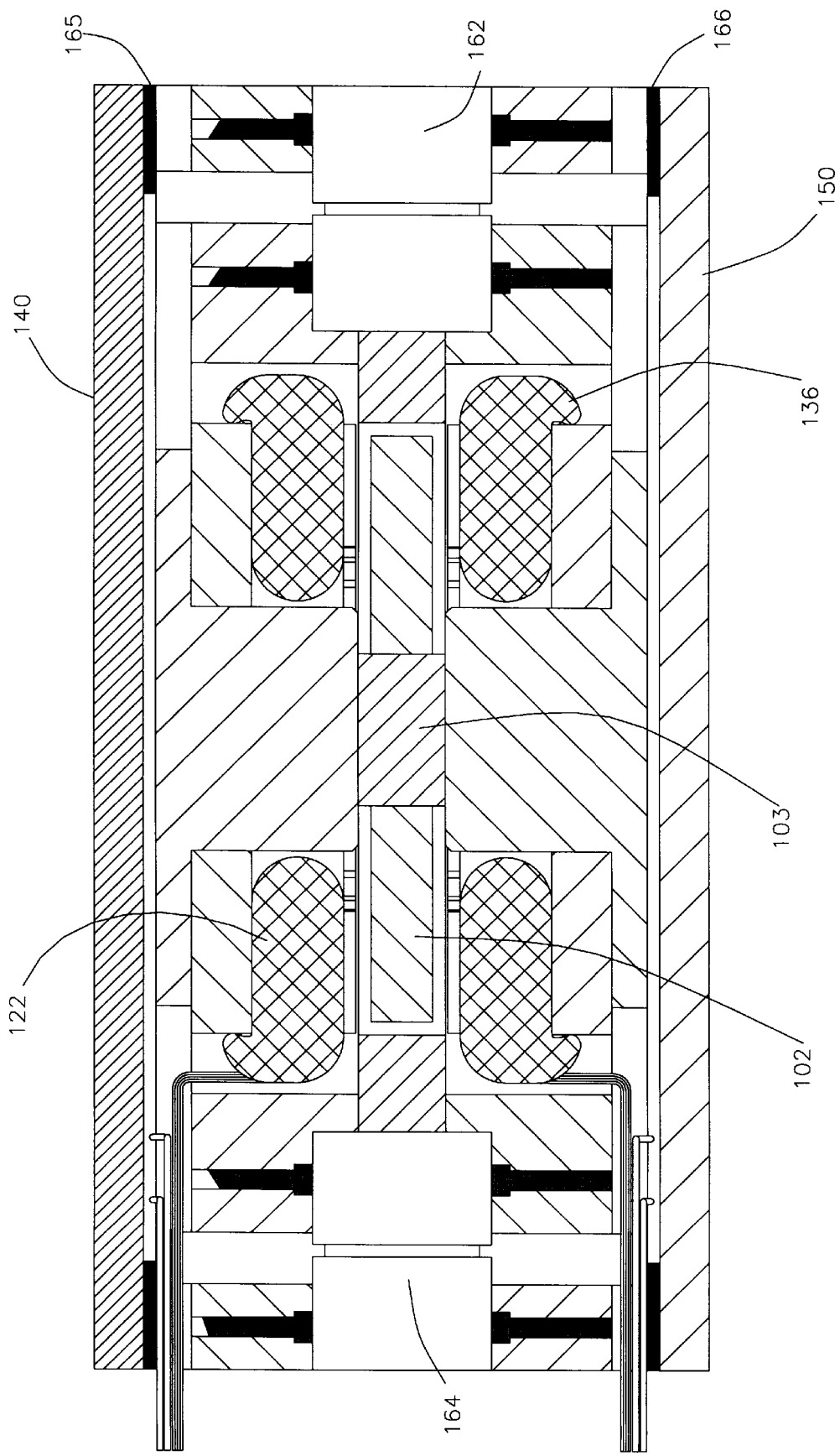
FIG. 5 is a cross-sectional view of the gyroscope of FIG. 4.

FIG. 5 is a cross-sectional view of the assembled gyroscope of FIG. 4. It consists of the motor stators 122 and 136, the disk wheel 102, the journal post 103, the flexures 162 and 164, the cover layers 140 and 150 and the TSM spacer layers 165 and 166 which enable the rotation of the TSM and set the pick-off sensitivity. Note that the placement of the flexures requires machining into the stator layers as well as the mechanical layers for this particular flexure design.

Closed-Loop Gyro Option with Actuator/Sensor; Milli Approach

Figure 6:
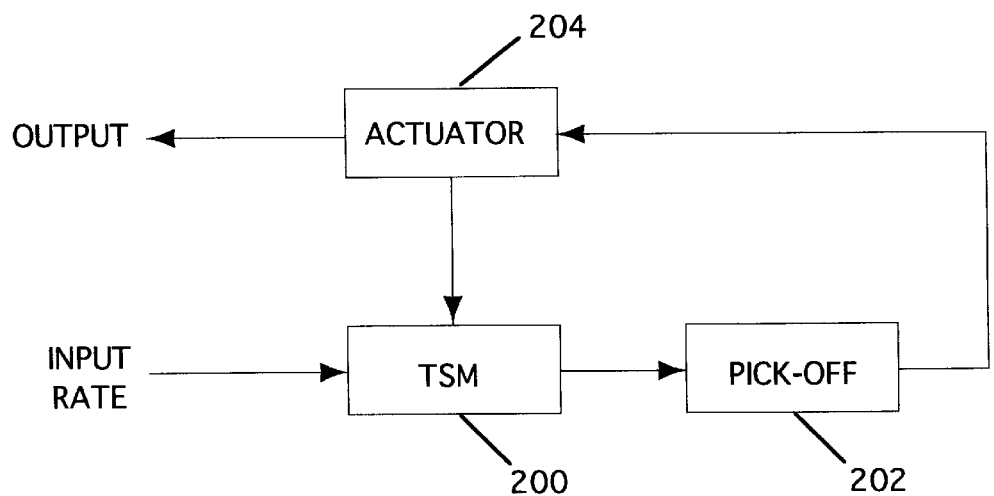
FIG. 6 is a schematic diagram of a closed loop operation of the gyroscope of this invention.

The closed-loop gyro option refers to the maintenance of the TSM at a null (zero rotation) position. This would require an actuator to apply a counter force to the TSM to cancel the gyroscopic torque. The control loop block diagram is shown in FIG. 6. Its operation is described as follows: Input Rotation Rate rotates the TSM 200, the Pick-off 202 senses the rotation, a feedback is applied to the actuator system 204 to hold the TSM deflection at zero, and, the output is provided in terms of the current necessary to provide the actuation force, which is suitably converted to a voltage.

An electromagnetic actuator consisting of a core of soft magnetic material combined with conductor windings can be used. Although conventional fabrication methods can be applied, the millimachined version is described.

The approach for the electromagnetic actuator stator is to apply the same monolithic design and fabrication approach as described for the monolithic motor stator concept. Partitioning considerations favor locating the stator part (with wiring) in the top and bottom Cover Layers so that heat generated can be dissipated directly to the outside and the complexity of the Stator Layers is not increased.

At least two options are available for the make-up of the Cover Layer. It can remain of Alumina material and the necessary electromagnetic subcomponent plated onto it, or the whole layer can be grown by electroforming or other means with the subcomponents integrated within the material. A third option would be for a ferrite-based stator to be placed in a depresssion in the Alumina material of the cover.

The sensing function can be done by the same sets of electromagnetic components. The second option is to form the capacitive plates above the electromagnetic subcomponents with suitable insulation between them.

Figure 7:
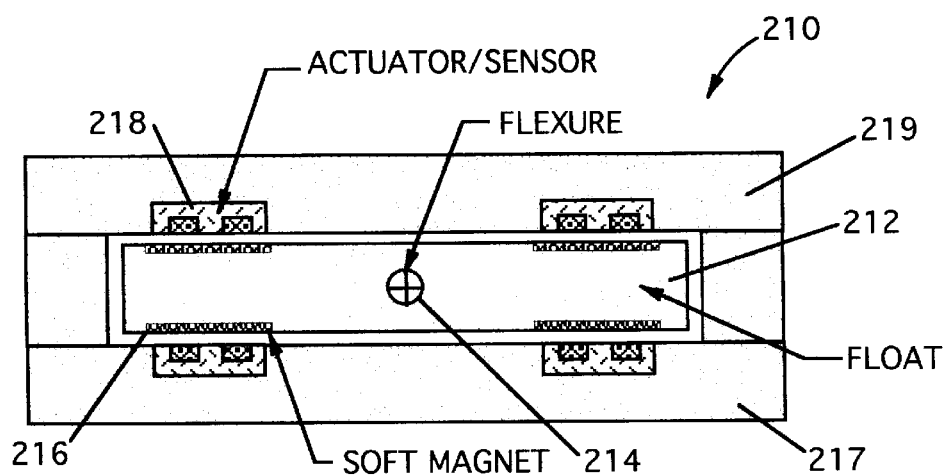
FIG. 7 is a schematic cross-sectional diagram of one manner of accomplishing actuators according to this invention.

The configuration of the "re-balance" actuator 210 is shown in FIG. 7. It consists of two coils 218 in the top Cover Layer 219 and two in the bottom Cover Layer 217. They are placed directly opposite the four sectors of the TSM 212. The rotor segments are located opposite the stator cores, none of which is shown in the drawing. The attractive force on the rotor segments is $$F \cong \frac{\mu_0 A N^2 \tilde{i}^2}{4g^2}$$

where $\mu_0$ is the permeability of the core material, A is the core area, N is the number of turns in the coil, $\tilde{i}$ is the rms applied AC current and g is the core-to-rotor segment distance. The net torque on the TSM is produced by increasing the current to one set of diagonally-placed coils and decreasing it for the other set. By reversing the current direction to both sets, the torque action on the TSM occurs in the opposite direction. The net torque, $M_{OA}$, in this implementation is dependent on the current difference, $\Delta \tilde{i}$ $$M_{OA} \cong \frac{\mu_0 A N^2 \Delta \tilde{i}}{2g^2} R_T$$

where $R_T$ is the distance from the flexure to the center of the torquer actuator.

When excited with AC current of suitable magnitude and frequency, the rotor cores are attracted to the stators, developing the desired re-balance torque about the float axis. Generally, DC excitation is not used due to the torquer hysteresis which results from magnetic hysteresis in the core materials.

In this scheme all of the stators are used to torque the float. A variation would be to use half of them to actuate and the other to serve as inductive pick-offs.

Gyroscope Electronics

Figure 8:
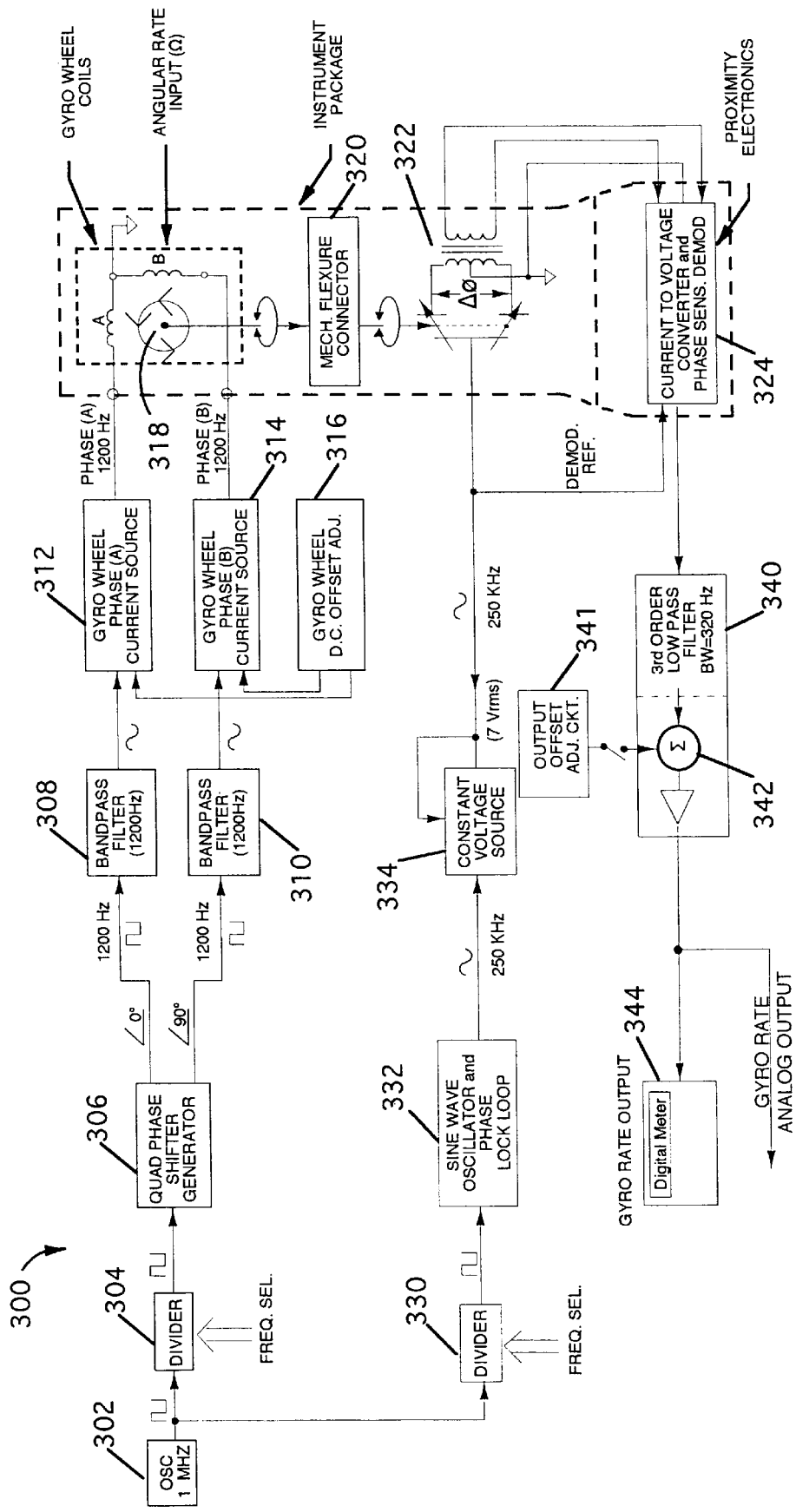
FIG. 8 is a block diagram of a manner of accomplishing open loop operation of the gyroscope of this invention.

FIG. 8 is a schematic view of the components of the open loop, rate gyro electronics 300. There are three parts: 1. the Instrument Package, 2. the Proximity Electronics and 3. the rest which go into a controller box.

In the Instrument Package are indicated two phases (sets of coils A and B), the mechanical flexure 320 which allows rotation of the TSM with input rate, and the schematic for the pick-off as two sets of capacitive plates 322. A differential transformer is used to extract the very small differential currents which flow in the capacitor pick-off and converted to voltage in the Proximity Electronics module which is part of the gyro package.

The Controller Electronics consists of two parts: 1. the motor drive and 2. the pick-off drive and signal processing.

The motor drive consists of two excitations of 1200 Hz for the 6-pole stator design (24,000 RPM) that are separated by 90 degrees (two phases). This is provided by a 1 Mhz Oscillator 303 that is counted down 304 and a Quad Phase Shifter Generator 306. To clean up the excitation signal and to obtain the required sinusoidal oscillation, a Band Pass Filter 308, 310 is used at 1200 Hz to extract the first harmonic of the square wave. The sine wave excitations modulate Current Source A 312 and Current Source B 314, respectively. The Gyro Wheel DC Offset Adjustment 316 is to remove any DC current from the coils.

The pick-off drive is obtained from divider 330 and a Phase Lock Loop (PLL) component 332 which contains a local oscillator to provide 250 Khz excitation. The approach used to derive the frequency signal for the Motor Drive is not used because the oscillation frequency is much higher. The local oscillator is phase-locked to the 1 Mhz Oscillator 302 to give it greater stability. The PLL 332 output modulates a Constant Voltage Source 334 to obtain the required voltage amplitude at 7 Vrms. The excitation is then split so that one leg goes to the excitation of the pick-off 322 and the second serves as the Demodulation Reference which goes to the Proximity Electronics 324. The Demod Reference is used to convert the output pick-off signal to a DC voltage proportional to the TSM angle. The approach of operating at high frequency followed by subsequent demodulation to DC is to operate the sensor at a frequency domain above the drifts of electronics and other noise sources. In other words the measurements are taken at a high rate and the effects of the slow drifts are averaged out. The output of the Proximity Electronics 324 which should be DC goes through a 3rd Order Low Pass Filter with a 5 Khz Bandwidth 340 to remove any residual of the 250 Khz drive signal. An Output Offset Frequency Circuit 341, 342 can also be referred to as an Electrical Offset. It takes out any electrical bias (offset) which corresponds to a signal when the TSM is at a mechanical null (zero rotation angle). Finally the gyro DC signal is output to a digital meter 344 on the controller box and for analog monitoring such as a strip chart.

Motor Component

Figure 9:
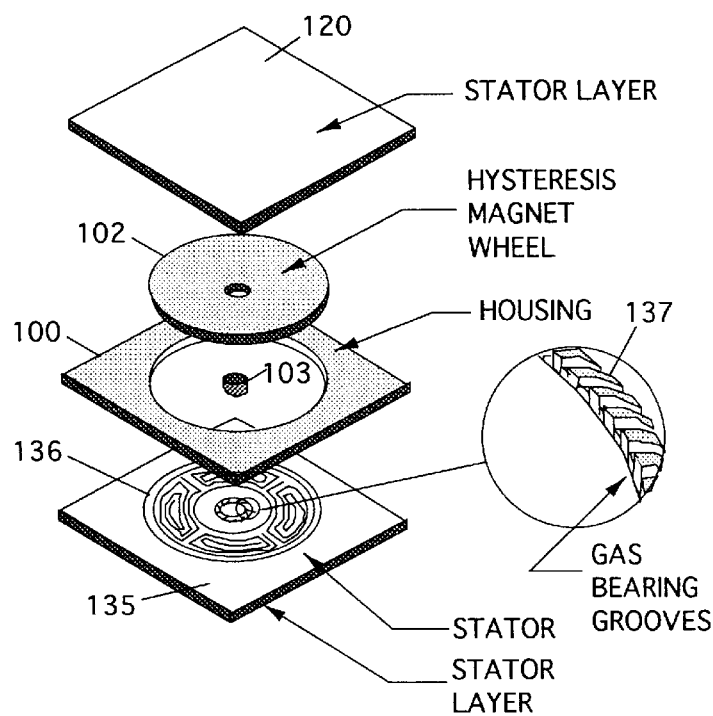
FIG. 9 is an exploded, schematic view of a preferred motor component of the gyroscope of this invention.

The motor component is described in FIG. 9. It comprises a rotor wheel 102 made of a high magnetic hysteresis loss material, a wheel housing 100, gas bearings (with bearing grooves 137 shown in some detail), and two stators, stator 136 being shown.

The hysteresis motor, illustrated in FIG. 9, consists of two slotted stators formed of ferromagnetic material and wound for two or three phase excitation, and a smooth cylindrical rotor 102 of a moderately hard ferromagnetic material. The stator windings are excited from balanced two or three phase voltage sources, producing a rotating magnetic field in the air gaps. The stator windings are distributed in the stator slots to produce an approximately sinusoidal distribution of magnetomotive force along the stator air gap surface. The hysteresis motor is a synchronous motor, meaning that in the steady state the rotor rotates in synchronism with the stator rotating magnetic field; as long as the required torque does not exceed the capability of the motor, the rotor is "locked" to the rotating stator field. The hysteresis motor has the advantage of being self-starting, having essentially full torque available from standstill to synchronism, and it develops a relatively large starting torque. Although the torque is ideally independent of rotor speed below synchronism, practically speaking there is some variation and, depending on the details of the design, the motor torque may decrease somewhat with increasing speed, up to synchronism. The motor is rugged, simple, and quiet and requires no electrical connection to the rotor, characteristics which make it well suited to driving gyro motors, where it has found wide use. It has the disadvantage for some applications of not having an indexed rotor position when synchronized, unless a small permanent magnet insert or other asymmetry is provided in the rotor. Since its efficiency is usually not exceptionally high, it is not built in large sizes for power purposes.

The rotating magnetomotive force of the stator tends to induce poles on the rotor but, owing to the hysteresis in the rotor material, the maximum flux density at any point in the rotor lags the maximum magnetizing force, so that the axis of the rotor magnetization lags the axis of the rotating field of the air gap. If the rotor is locked, the magnetic poles of the rotor follow the air gap field of the stator in space and hence go around the rotor at synchronous speed, and all power delivered to the rotor is dissipated in core loss, mostly hysteresis loss if the rotor is of high resistivity and laminated, but a torque is exerted on the rotor. The torque results from the lag between the rotor and stator fields hence the name hysteresis motor. It may be noted that the hysteresis motor has found wide use as a spin motor for traditional gyros.

While permanent magnet gyro spin motors can exhibit excellent efficiency, their use in the FPG application presented several design issues that must be resolved before a successful implementation can be implemented. The recognition of these issues motivates the selection of the hysteresis synchronous motor.

The issues are:

a. The permanent magnet motor requirement for special excitation circuitry for starting, and resumption of synchronous operation after accidental interruption of excitation—the hysteresis motor is self-starting and requires no special drive circuitry.

b. Difficulty in fully magnetizing the small size, multipole permanent magnet rotor—the hysteresis motor rotor is magnetized by the stator winding.

c. Ability to withstand the centrifugal stresses resulting from high speed rotation of the rotor—appropriate materials for hysteresis motor rotors have high strength and are fairly ductile, compared to permanent magnet materials.

d. Adverse effect of rotor porosity on gas bearing performance—rotor materials for hysteresis motors are fabricated by casting and rolling and have essentially no porosity.

e. Ability to achieve the excellent rotor surface finish necessary for good gas bearing performance—hysteresis motor rotor materials can be finished with excellent surface finish.

f. Affinity of some high energy permanent magnet materials (e.g., $SmCo_5$)for hydrogen gas, which—materials for hysteresis motor rotors do not have this characteristic.

g. Unknown suitability of permanent magnet materials as touchdown surface for gas bearing—while this is also true of hysteresis motor rotor materials, they have the general characteristics need for good performance in this respect, and can be readily coated with wear resistant coatings if required for acceptable wear resistance.

Important considerations in the design of the motor are: (1) the dependence of motor efficiency on the separation between wheel and stator surface, (2) the power required, (3) and the heat generated.

Ferrite Stator Subcomponent

Ferrite cores are an alternative to the monolithic Milli stators. They provide simplification of fabrication since laminations are not required. The Gyro Design described above was designed to incorporate the ferrite stators. The motor is a two-phase, 6-pole design operated at 1200 Hz for a synchronous rotational speed of 24,000 RPM. Other speeds are possible subject to the power requirement, electronics modification and wheel capability.

Figure 10A:
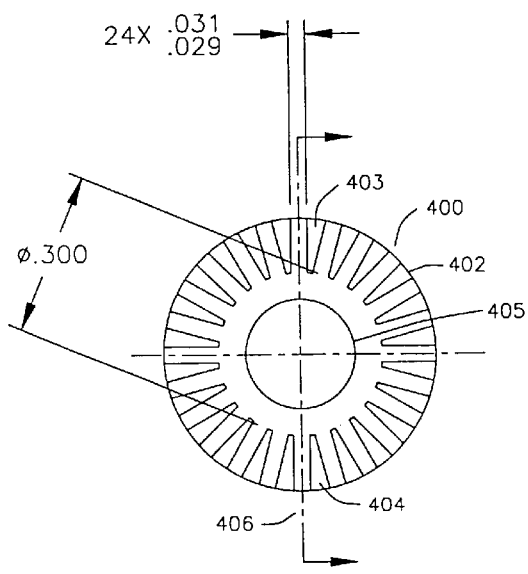
FIGS. 10A and 10B are top and side views, respectively, of the core of a preferred stator design according to this invention.
Figure 10B:
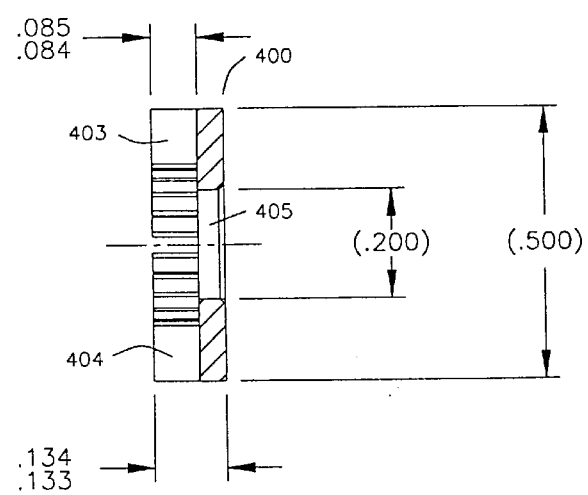
Figure 11:
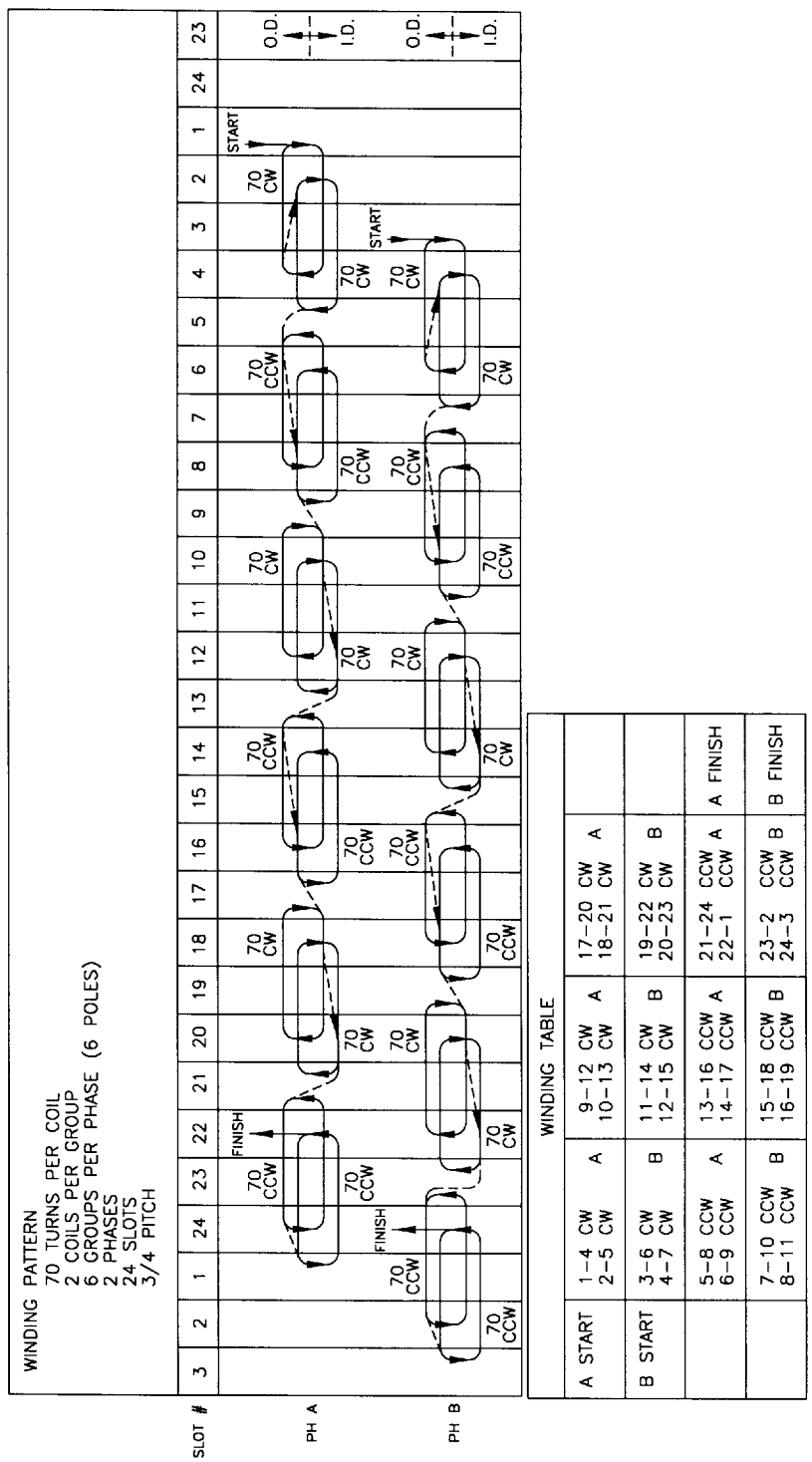
FIG. 11 is a winding diagram for the stator core of FIG. 10.

FIGS. 10A and 10B detail the ferrite core design. Core 400 is annular, with central opening 405. 24 radial cuts are made in the top surface to create slots and teeth 402. Teeth 403 and 404 can be seen in the cross section of FIG. 10B, which is taken along line 406, FIG. 10A. A parylene coating is applied for protection of the wire insulation. Coil winding details are shown in FIG. 11.

Wheel Subcomponent

The gyro wheel is the angular momentum generator. It is also the motor rotor and thus must satisfy two types of requirements: geometric and material. The following geometric requirements are essential to the gas bearing operation:

1. Uniform mass distribution to ensure dynamic balance for the gyro wheel;
2. Circularity of the disk to within less than a fraction of the wheel-to-housing clearance to allow free rotation and proper gas bearing operation;
3. Clearance between wheel and housing as required by the gas bearing, on the order of 1 to 2 microns;
4. Flatness of the end surfaces of the disk is maintained to within a fraction of the clearance;
5. Perpendicularity of disk outside diameter to the edge surface of the outer is held to a within fraction of the clearance over the thickness of about 0.050 in. (aspect ratio better than 5,000); and
6. Parallelism of the planar disk surfaces maintained and controlled to within less than a small fraction of the clearance.

The millimachining solution is to fabricate the wheel using high precision conventional macro technology that includes grinding and lapping.

The material properties requirements include high hardness and low porosity and high magnetic hysteresis for the excitation fields used. High hardness is required to prevent wheel damage upon touchdown. Porosity should be as small as possible since it adversely affects the bearing stiffness hence the support capability.

The magnetic requirement has been met with Simonds 73 heat treated by holding at 1560 deg F. for 30 minutes followed by an oil quench and then tempering at 1200 deg F. for 1 Hr.

Gas Bearing Component

The gas bearing component is shown in FIG. 12A. It consists of the journal and thrust bearing. Its function is to provide a pressurized gas film that will support the wheel as it spins (FIG. 12B). The journal will control the radial movement and the thrust the axial. The journal bearing consists of a journal post or rod 103 about which the wheel 102 spins with a clearance between the wheel inner diameter and journal outer diameter on the order of 1–2 microns nominally. The rod may have a groove pattern on the outside cylinder surface to add stability against whirling. The thrust bearing consists of a groove pattern 137 as shown in FIG. 13. The thrust pattern is located on each stator layer and they face the surface of the wheel. The clearance between the upper surface of the pattern and the wheel is on the order of a micron on each side. The primary parameter which enables the bearing to function is the clearance. The clearance also provides the fabrication challenge. The thrust bearings have mirror symmetry in order for them to act in the same direction.

The operation of the gas bearing works as follows. As the wheel spins, the viscosity of the gas forces it into the stationary grooves of the thrust pattern. The small clearance at the end of the groove channel reduces the flow thereby causing an increased pressure that acts back on the wheel. Since there are two thrust bearings working on opposite faces, the wheel is centered axially between the stator layers. The pumping action of the spin makes this a hydrodynamic bearing. The radial support is provided similarly if a grooved pattern were used on the journal rod. In the absence of such features, the load of the wheel acts to form a small clearance on one point on the circumference and the action of the spin is to force the gas through that clearance. The result is a pressure increase that lifts the wheel. The thrust works in combination with the journal in that it pumps gas into the journal.

The considerations for the gas bearing are:

1. Optimize the support capability for the wheel depending on the acceleration environment and slew rate of the instrument,
2. Minimize the drag torque to reduce the wheel drive power requirement, The advantages of the gas bearing are:

1. Since the disk makes no contact, the disk does not experience wear.
2. The gas is a fluid medium that also serves as an inexhaustible lubricant.

Ideally, the load capability of the journal and thrust bearings is the same.

Wheel Housing Subcomponent

The wheel housing subcomponent provides the outer retainer for the wheel and the journal post (rod) for the inner diameter. It also sets the thrust bearing clearance by making its thickness greater than that of the wheel by two clearance dimensions (2 microns nominally) since the Stator Layers rest on the wheel housing.

The relative thermal expansion between the wheel housing material and that of the wheel is critical because it can make the journal and thrust clearances dependent on temperature. The materials are matched.

Figure 14:
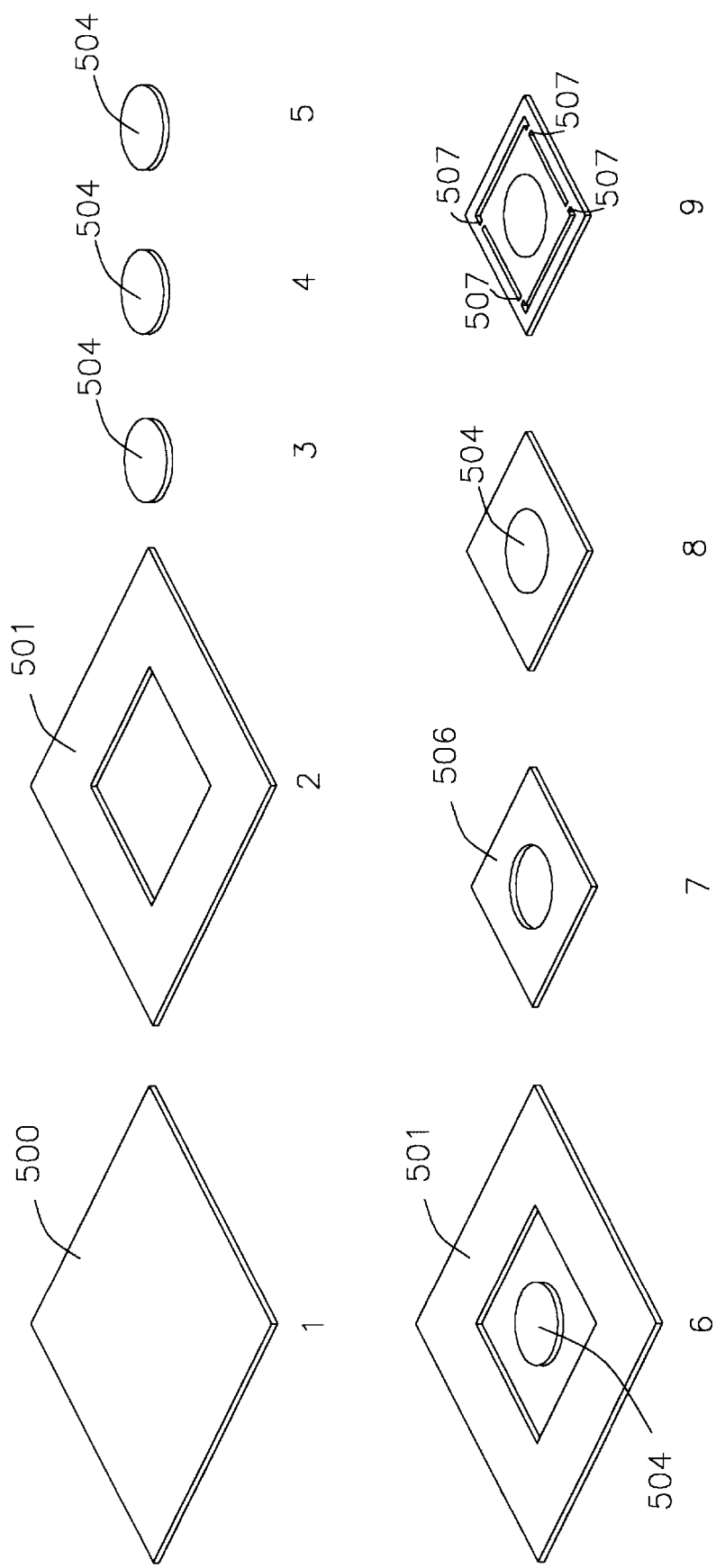
FIG. 14 is a schematic view of the manufacturing process for an embodiment of the mechanical layer of the gyroscope of this invention.

One millimachining approach to the fabrication of the housing and journal post is to fabricate a wheel of hysteresis material with the appropriate geometry and use it as part of a mold for an electroforming process as described with the aid of FIG. 14. Labelled portions 1–9 in the figure correspond to steps 1–9 detailed just below.

1. The starting point is a flat sheet 500 of material with the necessary magnetic and physical properties having the necessary flatness, parallelism and surface finish. From this sheet, a disk wheel and a frame are fabricated. This will insure identical thickness.
2. The frame is formed by cutting out a square section 502 from the center of the sheet 500; the inside dimensions of the frame are those of the gyro mechanical layer.
3. From the square section cut in the previous step, a wheel 504 is machined with the appropriate precision of circularity and edge verticality for the inner and outer diameters.
4. One planar surface of the rotor 504 is ground and lapped to reduce its thickness by twice the required thrust clearance, which is nominally 2 microns. The wheel is now thinner than the frame by this amount.
5. The wheel 504 is coated all around with a sacrificial layer to bring its thickness back to the thickness of the frame.
6. The frame 501 is placed onto a glass mandrel fixtured for a plating bath. The wheel 504 is then placed in the center of the frame and also onto the mandrel. The wheel and frame form a housing mold between the wheel and frame and a journal post mold within the inner diameter, not visible in the drawing. A seed layer is applied to the glass surface and the electroforming fills the molds.
7. The housing and wheel (together labelled 506) are separated mechanically from the frame and glass mandrel.

8. The wheel 504 and journal post are freed from the housing by removing the sacrificial coating.
9. A pattern is cut to form the center section and outer frame while forming tangs 507 which are removed after assembly and the placement of the flexures.

By this process, parts are custom fitted to each other and the clearance is established by the sacrificial coating/layer.

An alternative method to the fabrication of the wheel, is to begin with a high precision mold in the shape of a wheel into which can be deposited hysteresis magnetic material. The wheel formed can then be used as part of a mold to electroform the housing and journal as described above. This mold is re-usable.

Thrust Bearing Subcomponent

The thrust bearing is designed to provide the maximum load bearing capability for the minimum drag for a given spin rate. The design consists of a spiral pattern of grooves whose angle, extent, clearance, number, depth and ratio of groove area to non groove area are parameters to be selected. The parameters for this particular configuration are:

angle: 17 degrees
extent: 0.023 inches
clearance: ~40 microinches
depth: ~80 microinches
ratio: 0.6
spin rate: 24,000 RPM
load bearing: ~60 g
number of grooves: 23

Other sets of parameters are possible depending on surface availability, speed of rotation, desired load bearing capability and mode of fabrication, etc.

Fabrication is accomplished by providing the proper base material structure. Alumina material has been selected for this gyro design for the Stator Layer to accommodate the needs of the gas bearing. Alumina provides a rigid, hard surface that is highly polishable to a small fraction of a micron. Photolithography in conjunction with a resist is used to pattern the design onto the surface. Etching is used to cut into the Alumina to form the grooves.

An alternative fabrication approach is to deposit a suitable hard film with a thickness equal to the groove depth. Patterning is then done and etching of this material can be carried out to form the grooves.

Since the thrust bearing groove patterns face each other, the designs need to be of opposite handedness.

Pick-Off Component

The pick-off component consists of facing capacitive plates located on the surfaces of the Stator and Cover Layers. There are two sets symmetrically placed on either side of the TSM null plane. Their function is to measure the rotational motion of the TSM, which is the output of the gyro. The symmetrical arrangement by the sets of plates makes the pick-off insensitive to linear displacement of the TSM between the covers.

Figure 15A:
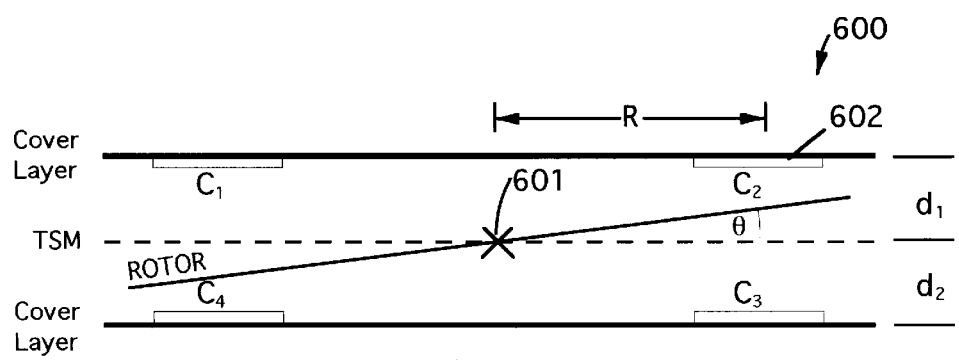
FIG. 15A is a schematic, conceptual diagram of the capacitive pick-offs of FIG. 15A.

The pick-off consists of 4 capacitors, C1–C4, is shown in FIG. 15A. d1 and d2 are the gaps. Although the intent is to make the gaps equal, it is expected that they will be a little different. R is the distance from the center of the flexure 601 to the center of the capacitive plate 602.

Figure 15B:
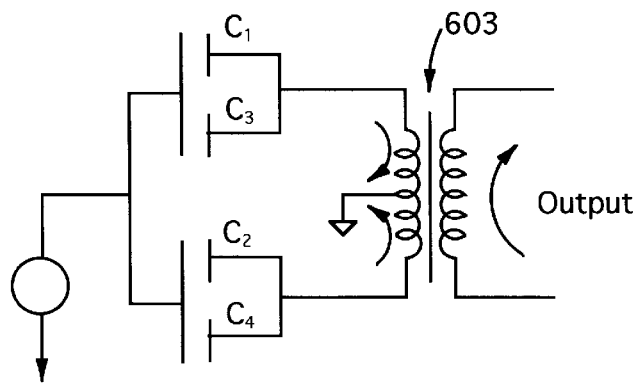
FIG. 15B is a simplified circuit drawing of the pick-offs of FIG. 15A.

The capacitors are connected in parallel as shown in FIG. 15B so that C1 and C3 add and C2 and C4 add. The sums are connected to the primary of a transformer 603 with a center tap to ground. For a TSM that is centered between the cover plates, the currents in the primary cancel. With TSM rotation, one current becomes larger than the other and the net current induces a corresponding current in the secondary. The output current amplitude is dependent on the difference of the sum capacitances.

The difference of the capacitive sums is the signal obtained. It is given by:

$$\delta C = \frac{2\epsilon_o A \Delta}{d_1^2} + \frac{2\epsilon_o A \Delta}{d_2^2}$$

where $\Delta = R\upsilon$ for simplicity and $R\tan\upsilon \approx R\upsilon$ for small angles is the change in gap caused by the deflecting center beam (TSM). $\epsilon_0$ is the dielectric constant of air and A is the overlap area of the capacitors.

The excitation of the circuit is oscillatory at 250 kHz. We make use of the relationship between the peak current, capacitance, the peak voltage, $V_{pk}$, and excitation frequency, $\omega$, and the fact that the differential transformer has a gain of one to write the expression for the peak output current:

$$I_{pk} = V_{pk} \omega \delta C$$

The output current is related to the TSM angle by combining the last two expressions:

$$I_{pk} = 2\epsilon_o A R V_{pk} \omega \left( \frac{1}{d_1^2} + \frac{1}{d_2^2} \right) \upsilon$$

It's important to note that as long as $d_1 + d_2$ = constant, as the TSM moves up and down in between the stators, the result is not changed to first order.

Figure 16A:
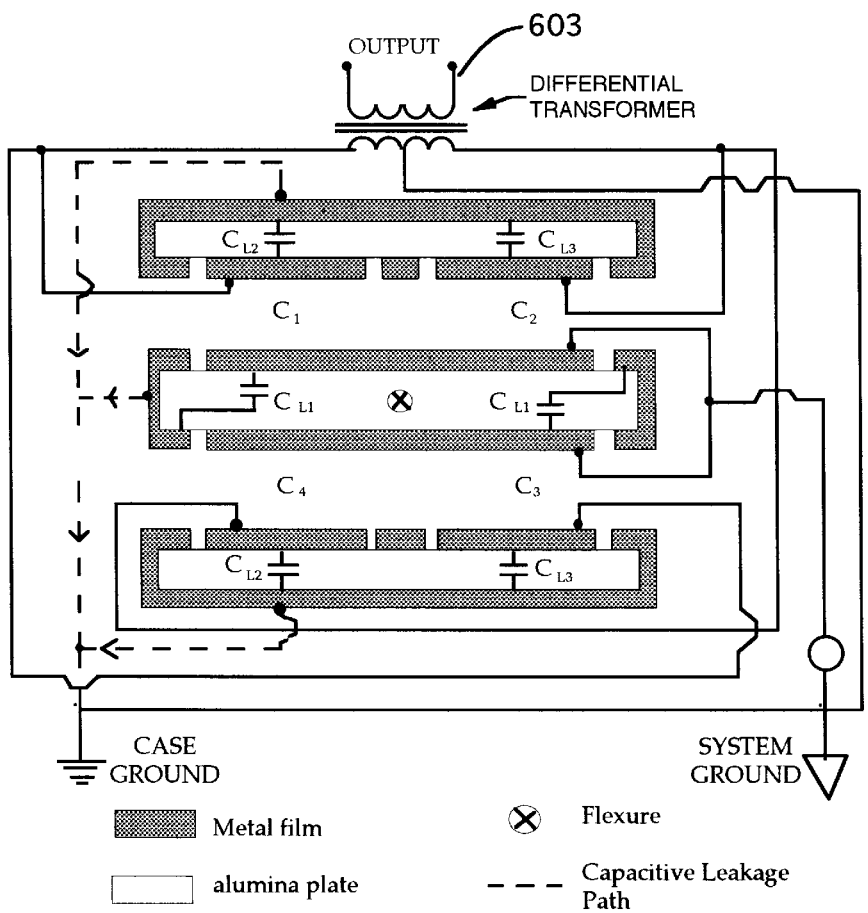
FIG. 16A is a diagram illustrating an embodiment of the pick-off capacitors for the flat-pack gyroscope of this invention.

FIG. 16A gives more comprehensive details of the TSM pick-off design and considerations. It represents schematically the TSM construction and choices of materials for the Gas Bearing Gyro. The motor parts are not shown and the flexure position is indicated with an "x".

The figure gives the connections of the primary capacitors, C1 to C4, to the differential transformer. In addition, leakage capacitances are included as well as the leakage paths using dotted lines. The rotor of the TSM is made of Alumina. Capacitive plates made of deposited copper are used and are excited. The capacitive leakage, $C_{L1}$, should be small since Alumina is electrically insulating and thick.

The top and bottom Cover Layers are made of Alumina and are therefore insulating as well as fairly thick. The leakage capacitances, $C_{L2}$ and $C_{L3}$, are small.

Considerations for stability were two:

1. The outside of the covers should be covered with a metallic film to shield the capacitors from external voltages, and
2. The case ground is tied to the system (instrument) ground to keep the leakage capacitances constant.

Figure 16B:
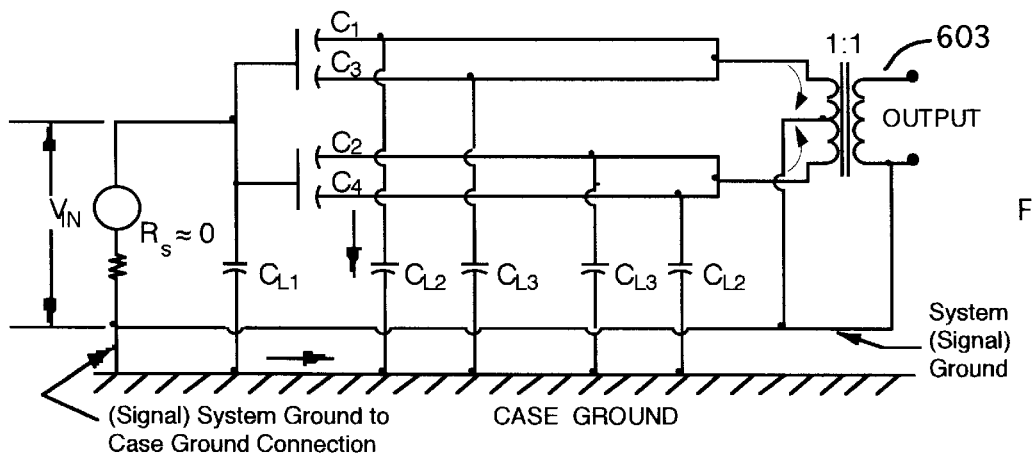
FIG. 16B is a circuit diagram of the capacitors of FIG. 16A.

FIG. 16B shows the circuit diagram including the leakage capacitances. The position of $C_{L2}$ and $C_{L3}$ in the circuit clearly shows how their instability would affect the primary currents we wish to detect. This is also true for $C_{L1}$ but in addition, it's important that its value be small otherwise the circuit will require a larger driving voltage and hence a larger supply.

Typical values for the capacitances are:

$C_{L2} \approx C_{L3} \approx 3.6$ pF for alumina dielectric of $\epsilon/\epsilon_0 \approx 6.0$; $\epsilon_0 \approx 0.089$ pF/cm $C_1 \approx C_2 \approx C_3 \approx C_4 \approx 8.0$ pF for $d \approx 0.003$ in. $= 7.6 \times 10^{-3}$ cm and A=0.685 cm².

$C_{L1} = C_{L2} \approx 7$ pF

We can relate gyro input rate to TSM angle deflection:

$$\dot{\phi}_{gyro} = \frac{K_{flexure}}{H_{wheel}} \nu_{TSM}$$

The differential transformer 603 is a means to measure very small capacitance differences with minimum noise by taking the difference as soon as physically and electrically possible. The transformer is placed very close to the pick-off so that capacitance noise in the leads is minimized. A common amplifier is then used to boost the signal.

A physical overlap exists between the stator and rotor patterns so that the area subtended is not changed with angle of rotation.

Pick-Off Stator Subcomponent

The pick-off stator is located on the stationary part relative to which another part moves. In this case it is on the Cover Layer.

The cover base material is Alumina because of its electrical insulating properties and its rigidity and dimensional stability. Rigidity and stability are important to maintain a constant pick-off gap.

The capacitive plates are fabricated by the deposition of an adhesion layer to the surface followed by deposited copper. The plate geometry is achieved through photolithographic and photoresist patterning. Interconnecting circuitry is similarly defined and is led to the edge of the layer for external connection.

An electrically conductive film is applied to the outside of the Cover Layer to provide a shield to the capacitive structure whose function can be affected by external voltage signals.

Pick-Off Rotor Subcomponent

The pick-off rotor is located on the moving part. It is located on the Stator Layer.

The Alumina TSM Stator Layer material provides the electrical insulation. The capacitive plates are fabricated by the deposition of an adhesion layer to the surface followed by deposited copper. The plate geometry is achieved through photolithography and photoresist patterning. Circuitry is similarly defined and is terminated at the edge of the layer.

TSM Component

The TSM consists of the motor component combined with the flexures. Maintaining a stable null position of the TSM is an important performance determinant, as variations in the null appear as bias variations in the gyro. The flexure spring constant and the inertia of the float determine the resonant frequency of the TSM. The resonance frequency will impact the bandwidth of the gyro, and the control loop if closed loop operation is desired.

Support Structure

The TSM structure consists of the moving assembly which is supported by two flexures. Its function is to provide a structure to support the wheel and motor. The motor needs to be part of the moving structure since it needs to be with the wheel.

Requirements are that the structure defines the output axis and therefore it should be maintained it constant relative to the package. In addition it needs to be balanced otherwise it is pendulous and non-gyro TSM rotation can occur with vehicle acceleration.

The structure also needs to manage the heat generated by the motor by providing a large surface area and convection across the pick-off gap.

Flexure Subcomponent

The flexure provides a restraining torque against which the gyro torque acts resulting in a net angle deflection proportional to input rotation rate for the Rate Gyro implementation. The stiffness of the flexure and the pick-off sensitivity are selected to provide the sensitivity required. The lower the stiffness, the greater the angle occurring from the same input angular rate.

The flexure also provides the support necessary to maintain the TSM centered within the gyro case.

Assembly and Package

The FPG design was developed with the package requirements addressed from the beginning of the design process. The layers will stack and provide enclosure and supporting structure for the contents. In addition the thermal sources were arranged symmetrically with respect to the outside of the package and mounting surfaces to provide controlled dissipation to the substrate as well as a balanced environment for the internal components and the minimization of intralayer stresses. Thermal neutrality is the goal and it addresses thermal expansions in the instrument. It takes into consideration the thermal expansions of the various materials used and the geometries to achieve zero net relative expansions. This is important in a multi-layered structure that may be susceptible to bowing. In the case of the wheel housing component, it is necessary that the relative expansions of the wheel and the housing be negligible otherwise the operation of the gas bearings is affected by the resulting clearance changes.

The routing of electric signals and the delivery of electric power is accomplished through the electrical connections to internal components, which are at the edges of the layers, consequently, all internal electrical components are accessible through the outside of the package and do not require dis-assembly.

The layers are to be bonded together with an epoxy adhesive.

Although specific features of the invention are shown in some drawings and not others, this is for convenience only, as each feature may be combined with any or all of the other features in accordance with the invention.

Other embodiments will occur to those skilled in the art and are within the following claims.

What is claimed is:

1. A single degree of freedom, spinning wheel gyroscope for determining rotation about a gyroscope input axis, comprising:

a fixed case;

a torque summing member mounted within said case by a pair of coaxial flexures, for pivoting on said flexures about an output axis which is transverse to the gyroscope input axis;

a disk encircled by said torque summing member and adapted to rotate about a spin axis which is transverse to both said output axis and the gyroscope input axis;

means for rotating said disk about said spin axis;

means for determining the pivotal position of said torque summing member about said output axis; and means, responsive to said means for determining the pivotal position of said torque summing member, for determining rotation of said case about the gyroscope input axis.

2. The single degree of freedom gyroscope of claim 1 wherein said gyroscope is constructed of a plurality of discrete layers, and in which said disk is within a discrete layer of said gyroscope.

3. The single degree of freedom gyroscope of claim 2 in which said means for rotating said disk about said spin axis includes disk driving means located in two discrete stator layers each directly adjacent to said discrete layer in which said disk is located.

4. The single degree of freedom gyroscope of claim 3 in which said disk driving means includes motor stators in each of said two discrete stator layers.

5. The single degree of freedom gyroscope of claim 4 in which said motor stators each include means for creating a rotating magnetomotive force on said disk.

6. The single degree of freedom gyroscope of claim 5 in which said means for creating a rotating magnetomotive force includes a multi-phase, multi-pole stator, and means for energizing the stator poles in quadrature to create a rotating electromagnetic field acting upon said disk.

7. The single degree of freedom gyroscope of claim 6 in which said disk is made of magnetic material with relatively high magnetic hysteresis.

8. The single degree of freedom gyroscope of claim 3 in which said means for determining the pivotal position of said torque summing member is partially carried by said two discrete stator layers.

9. The single degree of freedom gyroscope of claim 8 further including two discrete cover layers directly adjacent to said stator layers.

10. The single degree of freedom gyroscope of claim 9 in which said means for determining the pivotal position of said torque summing member is also partially carried by said two discrete cover layers.

11. The single degree of freedom gyroscope of claim 10 in which said stator layers carry capacitive pick-off members, and said cover layers carry capacitive pick-off members directly adjacent to but spaced from said pick-off members on said stator layers, to accomplish capacitive sensing of the distance between adjacent but spaced pick-off members.

12. The single degree of freedom gyroscope of claim 4 further including gas bearing means for supporting said disk as it rotates about said spin axis.

13. The single degree of freedom gyroscope of claim 12 in which said gas bearing means includes grooves in each of said two discrete stator layers, said grooves proximate said disk.

14. The single degree of freedom gyroscope of claim 13 in which said disk is annular, and in which said gas bearing means further includes a cylindrical journal post within the disk annulus central opening, said journal post very close to but not touching said annulus.

15. The single degree of freedom gyroscope of claim 1 in which said flexures have a relatively large spring constant, and a relatively small damping, to accomplish a rate gyroscope in which the angular pivotal deflection of said torque summing member is related to the time rate of change of gyroscope rotation about the input axis.

16. The single degree of freedom gyroscope of claim 1 in which said flexures have a relatively large damping and relatively small spring constant, to accomplish a rate integrating gyroscope in which the angular pivotal deflection of said torque summing member is proportional to the angle of rotation of said gyroscope about the input axis.

17. A single degree of freedom, multiple-layer spinning wheel gyroscope for determining rotation about a gyroscope input axis, comprising:
  a central discrete layer comprising a frame carrying an internal mechanical housing member mounted by a pair of coaxial flexures within said frame to rotate about an output axis transverse to the gyroscope input axis, and a central annular disk within said mechanical housing member, made of a magnetic material, and adapted to rotate about a spin axis which is transverse to both said output axis and the gyroscope input axis;
  means for rotating said disk about said spin axis, including motor stators located in each of two discrete stator layers each directly adjacent to one side of said central discrete layer in which said disk is located, in which said motor stators each include a multi-phase, multi-pole stator, and means for energizing the stator poles in quadrature to create a rotating electromagnetic field acting upon said disk;
  wherein said motor stators are each carried by a stator support member, and in which said stator support members are fixed to said internal mechanical member to create a torque summing member;
  two discrete cover layers directly adjacent to said stator layers;
  means, carried by said stator support members and said cover layers, for determining the pivotal position of said torque summing member about said output axis; and
  means, responsive to said means for determining the pivotal position of said torque summing member, for determining rotation of said case about the gyroscope input axis.

18. A single degree of freedom, multiple-layer, flat-pack spinning wheel gyroscope for determining rotation about a gyroscope input axis, comprising:
  a central discrete layer comprising a flat frame carrying an internal mechanical housing member mounted by a pair of coaxial flexures within said frame to rotate about an output axis transverse to the gyroscope input axis, and a central annular disk within said mechanical housing member, made of a magnetic material, and adapted to rotate about a spin axis which is transverse to both said output axis and the gyroscope input axis;
  means for rotating said disk about said spin axis, including motor stators located in each of two discrete stator layers each directly adjacent to one side of said central discrete layer in which said disk is located, in which said motor stators each include a multi-phase, multi-pole stator, and means for energizing the stator poles in quadrature to create a rotating electromagnetic field acting upon said disk;
  wherein said motor stators are each carried by a stator support member, and in which said stator support members are fixed to said internal mechanical member to create a torque summing member;
  flat stator layer external frames surrounding each said stator support member;
  mechanical tangs between each said stator layer external frame and said stator support member surrounded by said external frame, to maintain said stator support members fixed during gyroscope assembly;
  two discrete flat cover layers directly adjacent to said stator layers;
  wherein said stator layer external frames are each fixed to a said cover layer and to said frame of said central layer, to create a fixed gyroscope case;
  capacitive pick-off means carried by said stator support members and said cover layers, for determining the pivotal position of said torque summing member about said output axis; and
  means, responsive to said capacitive pick-off means for determining the pivotal position of said torque summing member, for determining rotation of said case about the gyroscope input axis.

* * * * *